(12) United States Patent
Rubas

(10) Patent No.: US 7,686,868 B2
(45) Date of Patent: Mar. 30, 2010

(54) MEMBRANE MODULE FOR SEPARATION OF FLUIDS

(75) Inventor: Paul J. Rubas, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1154 days.

(21) Appl. No.: 10/533,149

(22) PCT Filed: Sep. 23, 2003

(86) PCT No.: PCT/US03/29945

§ 371 (c)(1),
(2), (4) Date: Apr. 27, 2005

(87) PCT Pub. No.: WO2004/060539

PCT Pub. Date: Jul. 22, 2004

(65) Prior Publication Data

US 2005/0284293 A1    Dec. 29, 2005

Related U.S. Application Data

(60) Provisional application No. 60/434,947, filed on Dec. 19, 2002.

(51) Int. Cl.
*B01D 53/22* (2006.01)
*B01D 63/00* (2006.01)
*B01D 59/12* (2006.01)

(52) U.S. Cl. .................. 96/7; 210/321.65; 210/321.66; 210/321.67; 210/321.68; 210/321.69; 210/321.75; 210/321.71; 210/321.72; 210/321.73; 210/321.74; 210/321.76; 210/321.77; 210/321.78; 210/321.79; 210/321.81; 210/321.82; 210/321.83; 210/321.84; 210/321.85; 95/45

(58) Field of Classification Search ...................... 95/45; 96/7; 210/232, 332, 500.23, 31.65–321.89, 210/9, 500.232
See application file for complete search history.

(56) References Cited

U.S. PATENT DOCUMENTS 2,358,626 A * 9/1944 Cariss .................. 122/106

(Continued)

FOREIGN PATENT DOCUMENTS

WO    WO/99/26717    * 6/1999

(Continued)

OTHER PUBLICATIONS

PCT International Search Report for PCT/US03/29945, mailed Dec. 22, 2003, 5 pages.

(Continued)

*Primary Examiner*—Walter D Griffin
*Assistant Examiner*—Amber Orlando

(57) ABSTRACT

A membrane separation module (10) has a shell (11) having inlet port (20), outlet port (21) and a plurality of membrane units (12) disposed therebetween. Each membrane unit (12) has a plurality of elongated membrane elements (13), with at least a portion of each membrane element (13) having a semipermeable surface to permit selective permeation of one or more components of a multi-component feed fluid. The plurality of elongated membrane elements (13) are attached to collecting manifolds (16) (17), with one of those manifolds (16) (17) being unrestrained, permitting axial movement of each membrane element (13) in response to temperature changes. At least one manifold (16) (17) from each membrane unit (12) is in fluid communication with a manifold (16) (17) from one other membrane unit (12).

17 Claims, 3 Drawing Sheets

U.S. PATENT DOCUMENTS

| | | | | | |
|---|---|---|---|---|---|
| 2,678,529 | A | * | 5/1954 | Buchi | 60/321 |
| 3,027,715 | A | * | 4/1962 | Morris | 60/796 |
| 3,228,876 | A | * | 1/1966 | Mahon | 210/638 |
| 3,722,694 | A | * | 3/1973 | Agranat | 210/321.89 |
| 4,239,729 | A | * | 12/1980 | Hasegawa et al. | 422/48 |
| 4,254,086 | A | * | 3/1981 | Sanders | 422/187 |
| 4,451,369 | A | * | 5/1984 | Sekino et al. | 210/321.9 |
| 4,689,150 | A | * | 8/1987 | Abe et al. | 210/490 |
| 4,690,760 | A | | 9/1987 | Smoot et al. | 210/321.5 |
| 4,752,305 | A | * | 6/1988 | Johnson | 95/54 |
| 4,791,054 | A | * | 12/1988 | Hamada et al. | 435/2 |
| 4,865,630 | A | * | 9/1989 | Abe | 96/11 |
| 4,929,259 | A | * | 5/1990 | Caskey et al. | 210/321.89 |
| 5,164,081 | A | * | 11/1992 | Nichols et al. | 210/232 |
| 5,182,019 | A | | 1/1993 | Cote et al. | 210/321.8 |
| 5,332,498 | A | | 7/1994 | Rogut | 210/321.8 |
| 5,352,361 | A | * | 10/1994 | Prasad et al. | 210/321.81 |
| 5,820,654 | A | * | 10/1998 | Gottzman et al. | 95/54 |
| 5,922,201 | A | | 7/1999 | Yamamori et al. | 210/321.79 |
| 6,010,560 | A | * | 1/2000 | Witzko et al. | 96/8 |
| 6,033,632 | A | * | 3/2000 | Schwartz et al. | 422/190 |
| 6,083,390 | A | | 7/2000 | Hartmann | 210/232 |
| 6,149,817 | A | * | 11/2000 | Peterson et al. | 210/644 |
| 6,183,639 | B1 | * | 2/2001 | de Winter | 210/321.8 |
| 6,214,226 | B1 | | 4/2001 | Kobayashi et al. | 210/500.23 |
| 6,228,146 | B1 | | 5/2001 | Kuespert | 95/46 |
| 6,361,588 | B1 | | 3/2002 | Moratalla | 96/4 |
| 6,503,294 | B2 | * | 1/2003 | Yoshikawa et al. | 95/45 |
| 6,551,386 | B2 | | 4/2003 | Weiler | 96/4 |
| 6,613,231 | B1 | * | 9/2003 | Jitariouk | 210/650 |
| D481,782 | S | * | 11/2003 | Okazaki | D23/209 |
| 6,793,711 | B1 | * | 9/2004 | Sammells | 95/48 |
| 6,814,780 | B2 | * | 11/2004 | Bikson et al. | 95/51 |
| 6,926,829 | B2 | * | 8/2005 | Dannstrom et al. | 210/321.88 |
| 2002/0096458 | A1 | | 7/2002 | Thomassen | 210/134 |
| 2002/0153299 | A1 | * | 10/2002 | Mahendran et al. | 210/321.89 |
| 2005/0029192 | A1 | * | 2/2005 | Arnold et al. | 210/641 |

FOREIGN PATENT DOCUMENTS

| | | | |
|---|---|---|---|
| WO | WO/01/66231 | * | 9/2001 |

OTHER PUBLICATIONS

PCT International Preliminary Examination Report for PCT/US03/29945, mailed Jan. 14, 2005, 10 pages.

PCT Written Opinion for PCT/US03/29945, mailed Aug. 10, 2004, 6 pages.

* cited by examiner

MEMBRANE MODULE FOR SEPARATION OF FLUIDS

CROSS REFERENCE TO RELATED APPLICATION

This application is the National Stage of International Application No. PCT/US03/29945, filed 23 Sep. 2003 which claims the benefit of U.S. Provisional Patent Application No. 60/434,947 filed Dec. 19, 2002.

FIELD OF THE INVENTION

The present invention relates generally to a membrane module for separating one or more components from a multi-component fluid (gas or liquid).

BACKGROUND OF THE INVENTION

Permeable tubular membrane modules, sometimes called permeators, are used in a wide variety of fluid (gas or liquid) separations. In such operations, a feed stream is brought into contact with the surface of a semi-permeable membrane.

Membranes are thin barriers that allow preferential passage of certain components of a multi-component fluid mixture. Most membranes can be separated into two types: porous and nonporous. Porous membranes separate fluids based on molecular size and/or differential adsorption and diffusion rates. Gas separation membranes used in natural gas applications often have an asymmetric structure composed of a support structure that provides mechanical strength and a thin active layer that separates gases based on differences in solubility and diffusivity.

In a typical membrane separation process, a multi-component fluid is introduced into the feed side of a module that is separated into two compartments by the permeable membrane. The fluid stream flows along the surface of the membrane and the more permeable components of the fluid pass through the membrane barrier at a higher rate than those components of lower permeability. After contacting the membrane, the depleted feed stream, known as the "residue", "retentate", or "non-permeate", is removed from contact with the membrane by a suitable outlet on the feed compartment side of the module. The fluid on the other side of the membrane, known as the "permeate", is removed from contact with the membrane through a separate outlet. The permeate stream from the membrane may be referred to as being "enriched" in the permeable components relative to the concentration of the permeable components in the retentate stream. The retentate may also be referred to as being "depleted" of the more readily permeable components. While the permeate stream can represent the desired product, in most natural gas permeation processes the desired product is the retentate stream, and the permeate stream comprises contaminants such as $CO_2$ or other acid gases.

Most prior art membrane modules include: 1) individual hollow fibers or membrane tubes, or bundles of fibers or membrane tubes, 2) membrane tubesheets in the form of solid bodies of suitable material for potting the opposite ends of the membrane tubes such that their internal bores, or lumens, communicate through the membrane tubesheets, 3) a pressure container formed by an elongated pressure vessel, and 4) a pair of opposite end heads or caps closing the opposite ends of the pressure vessel. The pressure vessel thus contains, protects, and supports the tubular membranes. The opposite membrane tubesheets with the membrane tubes extending therebetween are supported and sealed within the pressure container and interior manifolds or chambers are formed between the outer faces of the membrane tubesheets and the vessel's end caps through which communication is established between end cap ports and the lumens of the membrane tubes which open at the outer faces of the membrane tubesheets. The tubular membranes are typically made from polymeric materials and the pressure vessel is typically made from either polymeric materials (for low-pressure applications) or steel (for high-pressure applications).

One disadvantage of such prior art modules is that the tubesheet thickness and weight increase significantly as the pressure rating and/or module diameter increase. Because of this, in some applications the tubesheet can become very thick, thereby significantly reducing the module packing density and increasing the weight beyond practical limits. When attempts are made to produce a large-diameter module, the large amount of membrane tubesheet material that must be positioned around the ends of the membrane tubes can present handling problems in positioning the membrane tubesheet around the ends of the membrane tubes. During operations in which wide variations in temperature occur, the membrane tubes and the membrane tubesheets can expand and contract which can compromise the integrity of the seal between the membrane tubesheets and the housing container.

Although most prior art membranes are based on relatively flexible polymer materials, a new generation of high-performance membranes is being developed based on relatively rigid, inorganic materials, such as micro-porous ceramics. These new materials potentially have greater resistance to chemical attack, greater thermal stability, increased permeance rates, and increased selectivity compared with existing polymeric membrane materials. One drawback with using these new materials with the prior art membrane module designs is that the pressure vessel is made of a first material that has disposed inside membrane components made of a second material, and which materials undergo differential expansion relative to one another. This differential thermal expansion can compromise the integrity of internal seals and can lead to mechanical failure of the membrane materials. It would be a major advance if large-diameter membrane modules having elongated tubular membranes could be made which overcome or minimize the problems associated with sealing the permeate side from the feed side under fluctuating temperature conditions.

SUMMARY

The present invention alleviates the problem of differential expansion between the membrane tubes and the shell since the inventive apparatus allows the membrane tubes to expand independently of the shell. The separation module of the present invention eliminates the conventional tubesheet and allows construction of large, high-pressure membrane modules. The module of the present invention comprises a hollow shell having a hermetic enclosure with a plurality of separation assemblies in side by side relationship disposed in the shell. Each separation assembly comprises a plurality of elongated membrane elements and at least a portion of each membrane element comprises a semipermeable surface to permit selective permeation of one or more components of the multi-component gas into the membrane element. One end of the membrane elements in a separation assembly is attached to and hermetically sealed to an inlet manifold and the opposing end is attached to and hermetically sealed to an outlet manifold. At least one of the manifolds is unrestrained, thereby permitting axial movement of each membrane element in response to temperature changes. The shell has at least one inlet conduit for introducing the multi-component fluid into the shell for treatment at a first pressure and at least one exit conduit for passage of treated multi-component fluid out of the shell. At least one manifold from each separation assembly is in fluid communication with a manifold from one other separation assembly. The plurality of separation assemblies are in fluid communication with each other. The module includes at least one exit conduit for passage of permeate at a second pressure that is lower than the first pressure from one of the manifolds out of the shell.

BRIEF DESCRIPTION OF THE DRAWINGS

The present invention and its advantages will be better understood by referring to the following detailed description and the attached drawings and in which like reference numerals are used to indicate like parts in various views.

DETAILED DESCRIPTION OF THE INVENTION

The present invention provides a membrane module designed to overcome the aforementioned shortcomings by eliminating the need for membrane tubesheets and substantially reducing the sealing contact between the feed side and permeate side of the membrane. The apparatus of the present invention generally comprises a container that contains a plurality of membrane units arranged to perform a desired separation of one or more components from a multi-component fluid, either liquid or gas. Generally several of the membrane units are used, although the number of units can be chosen to fit the particular use and need. The module is designed such that the feed side region of the module is sealed from the permeate side of the module to prevent fluid communication except through the membrane devices in the module.

The fluids that may be separated by the membrane module of the present invention are gases, vapors, or liquids which are capable of separation. For example, this invention may be used for gas separations such as acid gas separation from natural gas, the separation of volatile liquids from liquids, and the separation of high molecular weight or large particle size materials from liquid. The mixture of gases to be separated preferably comprises one or more of the following gases: oxygen, nitrogen, methane or other light hydrocarbons (such as natural gas), hydrogen, water vapor, carbon dioxide, hydrogen sulfide, nitrogen oxides, sulfur oxides, or helium.

The membrane module of the present invention will be described for separation of one or more fluids from one or more other fluids in which the separation is performed by transporting selectively one or more fluids across a membrane. In this invention, the membranes are preferably of tubular form and the module is preferably adapted for shell side feed wherein the feed fluid to be separated is passed around the exterior of the membrane tubes and the permeate passes into the bore or lumen of the membrane tubes.

Figure 1:
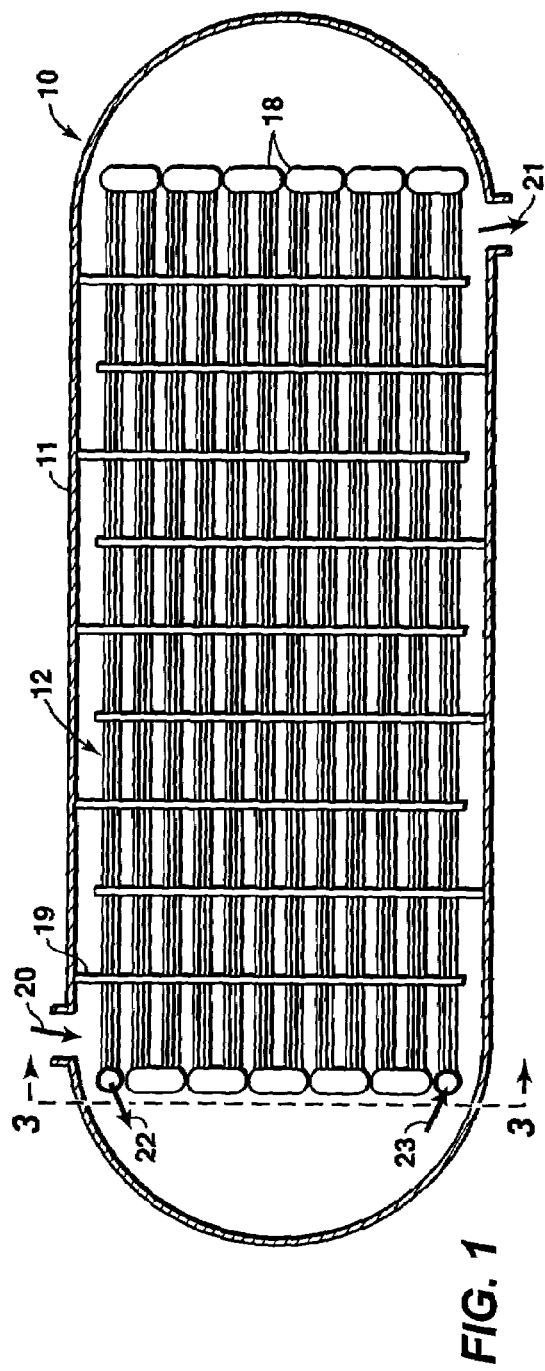
FIG. 1 is a sectional elevation view of one embodiment of the present invention showing a plurality of membrane units in a pressure vessel.

FIGS. 1-4 illustrate one embodiment of the present invention. Referring to FIG. 1, a membrane module 10 comprises a shell 11 having disposed therein a plurality of membrane units 12. The shell 11 has oblate ends and has sufficient strength to withstand the pressure and temperature conditions of the feed, preferably designed to withstand pressures of 1200 psia or more. Suitable materials for the shell 11 comprise, for example, metals such as steel, ceramics, composites, and the like. The preferred shell design is a cylindrical vessel because this shape is the most efficient for containing high pressures. The membrane units 12 as described in this patent are arranged in an ordered fashion, preferably parallel to one another.

Figure 2:
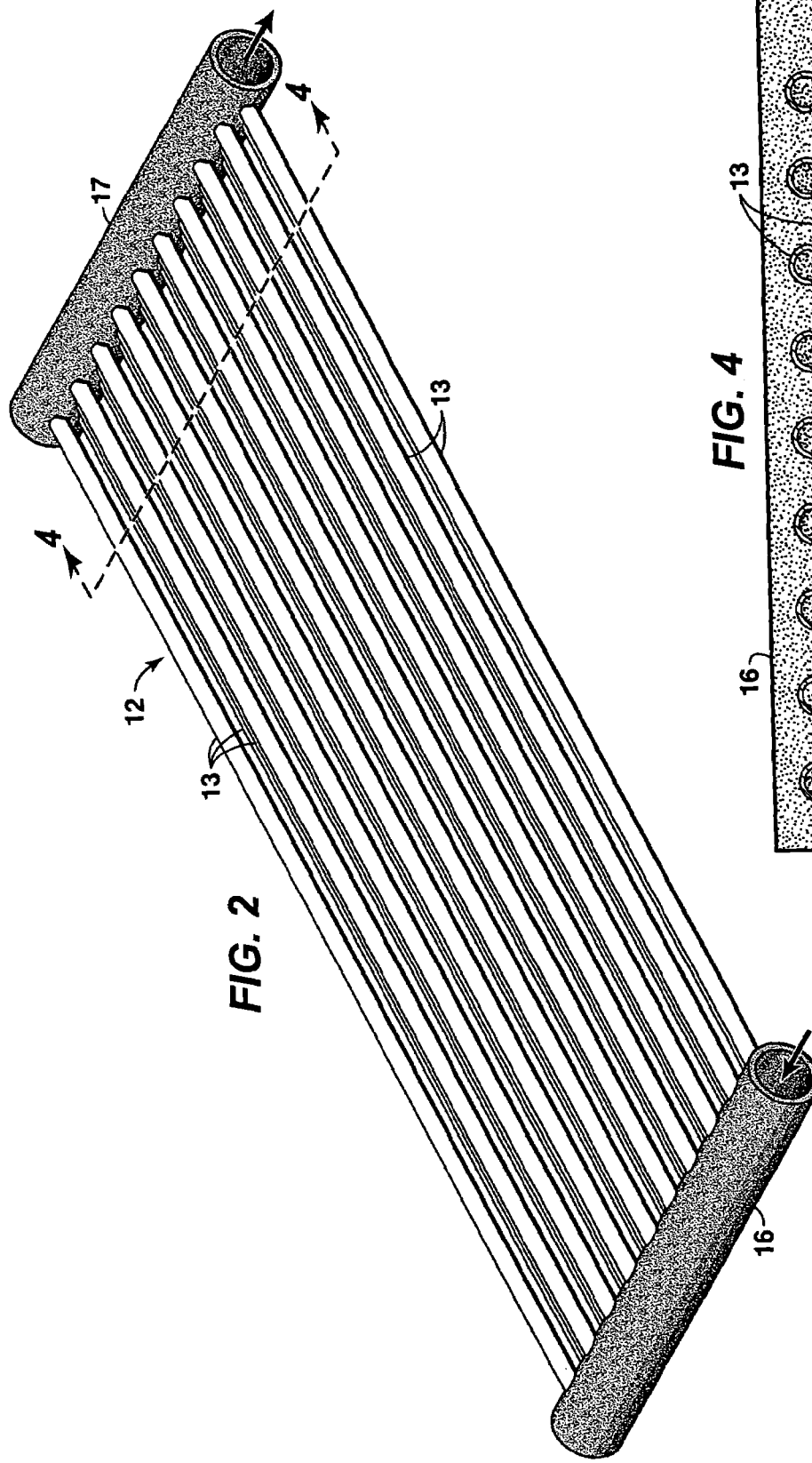
FIG. 2 is a perspective view of one membrane unit of the plurality of membrane units depicted in FIG. 1.
Figure 4:
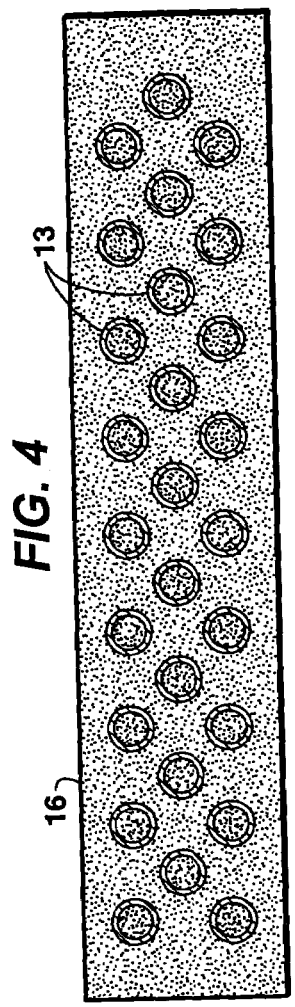
FIG. 4 is a partial cross-sectional view taken along lines 4-4 in FIG. 2.

FIG. 2 illustrates a perspective view, partially in section, of one membrane unit 12, which comprises a plurality of hollow, membrane tubes 13 that extend longitudinally in parallel. The membrane tubes 13 are connected by collecting manifolds 16 and 17 at both ends such that fluids can flow freely throughout the membrane unit 12. In FIGS. 2 and 4, three rows of membrane tubes 13 are shown between the manifolds 16 and 17; however, the number of rows and the total number of membrane tubes can be varied to suit the application. The membrane tubes 13 are preferably composed of a separation layer and a support with the separation layer being formed on the surface of the support. The support is designed to provide mechanical support to the separation layer while offering as little mass transfer resistance as possible. The flux through the membrane is primarily affected by the thickness of the separation material and the support. In general, it is desirable to have the separation layer, through which a permeating component must pass, as thin as possible yet sufficiently thick that the flow through the layer is not dominated by defects. The support is thick enough to provide adequate strength to the separation layer to withstand the separation conditions. Suitable composite membranes may comprise a thin separation layer formed on the surface of a thicker porous support that provides the necessary physical strength to the membrane. The number and length of the individual membrane tubes 13 used in the module 10 can be varied to suit the fluid flow rates and flux requirements of particular applications.

With respect to the composition of the separation layer, substantially any semi-permeable material currently available, or which may become available, can be used. The separation layer can be either symmetric or asymmetric, isotropic (having substantially the same density throughout) or anisotropic (having at least one zone of greater density than at least one other zone), and can be chemically homogenous (constructed of the same material) or it may be a composite membrane.

When membrane module 10 is used to remove contaminants in a natural gas stream, the separation layer preferably is composed of materials tolerant to temperatures above about 120° F. (48.9° C.) and pressures above about 1,200 psia (82.8 bar) and have adequate effective permeance and selectivity at those conditions. Most membranes in service for acid gas removal from natural gas streams are made from polymers, and most of these polymers either lack stability at the operating conditions (temperatures above 120° F. (48.9° C.) and pressures above about 1,200 psia (82.8 bar)) or do not provide adequate values of permeance or selectivity. Most of such polymeric membranes have been designed or selected to operate most effectively at temperatures below about 100° F. (37.8° C.). While certain polymers or glassy materials could give adequate performance at higher temperature and pressure conditions, it is preferred that the separation layer used in natural gas treatment be inorganic. The inorganic separation layer formed from, for example, zeolites, microporous silica, or microporous carbon, is preferably placed on a structured support. The separation layer preferably has pores ranging in size from 0.1 Å to about 10 Å.

The support should offer minimal mass transfer resistance with strength sufficient to withstand the stress created by relatively large pressure differentials across the membrane. Typically, the support is porous. It can be made from either the same or a different material from the active separation layer. Support materials for inorganic membranes include porous aluminas, silicon carbides, porous metals, cordierites, and carbons. Typically for asymmetric polymer membranes, the porous support is manufactured from the same polymer as the active separation layer; however, it is also possible to form a hybrid membrane structure in which a polymeric active separation layer is coated onto a porous inorganic support. In some polymer membrane manufacturing processes, the porous support material is formed simultaneously with active separation layer.

The invention is not intended to be limited to any particular separation layer or support, and the separation layer and support may comprise any material capable of giving adequate values for permeance and selectivity. This includes, for example, homogeneous membranes, composite membranes, and membranes incorporating sorbents, carriers, or plasticizers. Inasmuch as the composition and preparation of membrane tubes 13 are well known to those skilled in the art, a detailed description thereof is not provided herein.

An important step in incorporating the membrane tubes 13 into the membrane units 12 is sealing the support (or support plus separation layer) so that the hydrodynamic flow along the permeate and feed sides are physically separated. The seals and support are designed to withstand pressure differentials between the feed and permeate sides. The ends of the membrane tubes 13 are hermetically sealed to manifold conduits 16 and 17 in a manner which forces all of the permeate fluid exiting the membrane tubes to flow into at least one of the manifolds. This may be accomplished in any suitable fashion that prevents leaks from forming around the outer diameter of the membrane tubes 13 and the manifolds 16 and 17. For example, the membrane tubes 13 may be inserted a preselected distance into or completely through the wall of the manifolds with a sealed joint being formed between the membrane tubes 13 and the manifolds 16 and 17 by welding, soldering, brazing, bonding; heating the manifolds and shrink cooling over the membrane tubes 13; threading the end of the membrane tubes 13 into the manifolds 16 and 17; sealing with nut and gasket; or using a compression fitting.

Manifold conduits 16 and 17 are in fluid communication with each other by elbow conduits 18. The use of elbow conduits 18 to interconnect the membrane units allows flexibility in the design of the fluid flow path within the membrane units 12. For example, membrane units 12 can be interconnected for either series or parallel flow paths. In some cases, it may be desirable to plug one end of a manifold conduit 16 or 17 to direct flow through the membrane tubes 13 rather than to a manifold conduit from another membrane unit 12. The use of elbow conduits 18 to interconnect membrane units 12 can result in an overall structure that is relatively spring-like and therefore able to withstand strain due to thermal expansion more readily than if rigid headers were used. Also, the elbow conduits can allow for variations in the length of the manifold conduits 16 and 17 from one membrane unit 12 to the next. In this manner, the membrane units can be graduated in width to efficiently fill a cylindrical shell 11. Depending upon the method used to join the manifold conduits 16 and 17 to the elbow conduits 18, it may be possible to remove individual membrane units 12 from the module assembly for testing or service.

Figure 3:
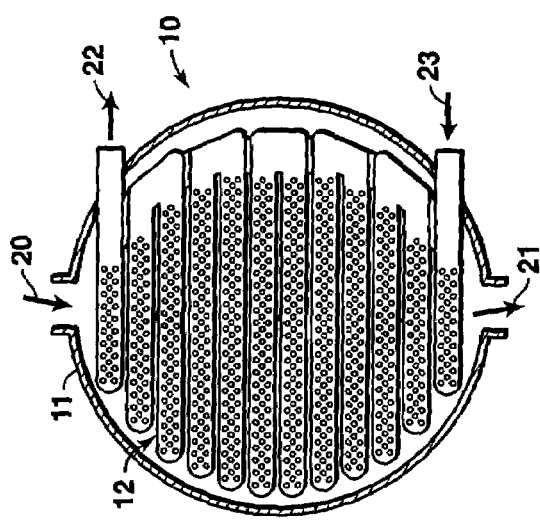
FIG. 3 is a cross section of the membrane module illustrated in FIG. 1 showing exemplary arrangements of a plurality of membrane units.
Figure 5:
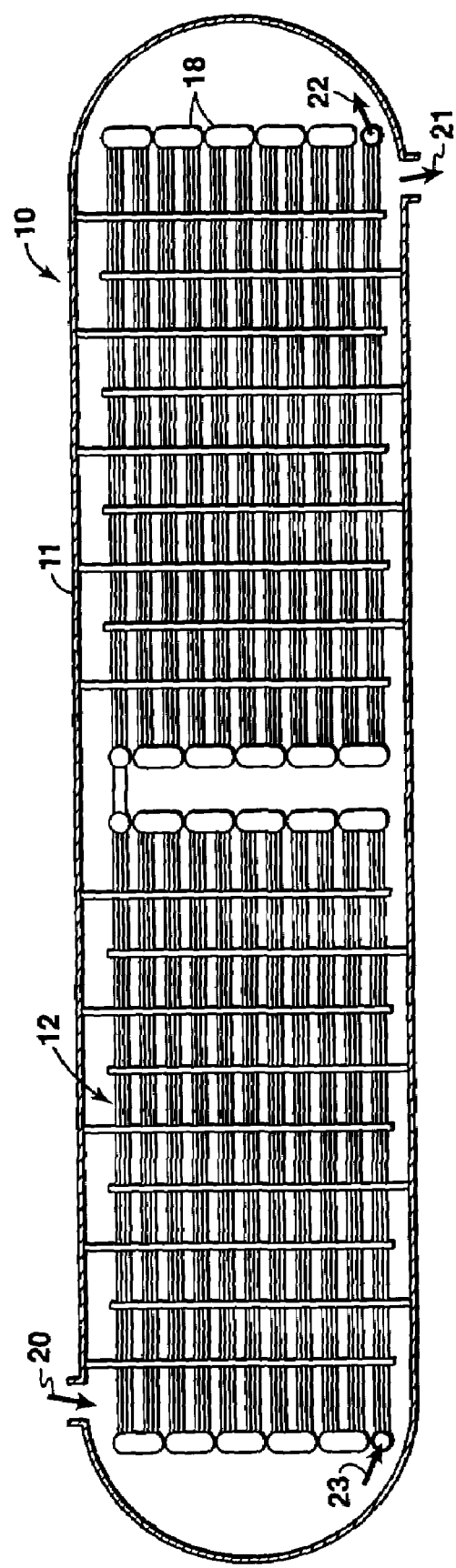
FIG. 5 is a partial cross-sectional, side view of a second embodiment of the present invention showing two groups of membrane units inside the membrane module.

The manifold conduits 16 and 17 are also in fluid communication with at least one external port 22 opening to the exterior of shell 11, thereby providing at least one flow passage of permeate with the one external port 22. As illustrated in FIGS. 1, 3 and 5, the membrane units preferably are also in fluid communication with an inlet port 23 through shell 11, thereby providing a fluid conduit for introduction of sweep fluid through the permeate side of the membrane tubes 13. Port 20 provides for introduction of fluid into the shell 11 and port 21 provides for the exit of treated feed from the shell 11. Ports 20, 21, 22, and 23 may be any inlet or outlet opening in the shell 11, nozzle, tube, fitting, hole, or the like wherein fluid enters or exits the shell 11 or manifolds 16 and 17.

The manifold conduits 16 and 17 can be formed of any material suitable for transferring the permeate from inside the membrane tubes 13 to outside port 20 under temperature and pressure conditions during operations. At least a portion of the manifold can be formed of the same material as the membrane tubes 13.

The modular nature of the membrane units allows modules of almost any size to be constructed. Elongated membrane tubes 13 can be constructed to extend substantially the length of the container or two or more bundles of stacked assemblies can be constructed within the container 10.

Baffles 19 are generally located transversely in the shell 11 to force the shell fluid to flow back and forth across the membrane tubes during its lengthwise traverse of the shell 11.

The membrane module must include structures to isolate the retentate from the permeate; the module must reliably seal the feed fluid from the permeate. Particularly for gas processing applications, such seals must be hermetic and able to sustain the operating conditions of the module, including elevated temperatures and pressure gradients, without adversely affecting the active membrane layer. The seals must also be physically and chemically stable to provide reliable operation over the lifetime of the membrane. The seals must be substantially gas-impermeable and able to withstand exposure to strongly oxidizing and reducing atmospheres, including hydrocarbons, hydrogen, alcohols, $H_2S$, $CO_2$, water vapor, oxygen, and air.

A seal is defined herein as a device for segregating two fluids which are typically at different pressures in adjacent regions of an apparatus or process system, wherein the purpose of the seal is to minimize the leakage of fluid from a higher pressure region to an adjacent lower pressure region. Absolute leak-tight seals are difficult or impossible to achieve in many practical applications. The objective in seal design and operation of the present invention is to limit leakage to an acceptable level which does not adversely affect the operation of the process that uses the seal. Process economics, product purity, system stability, safety, and environmental considerations must be considered in assessing leak impact and seal design.

The permeate can be removed by vacuum, reaction with other compositions including catalysts, reactants, enzymes, antibodies, sweep fluids, or the like. Accordingly, the present invention is not limited to the methods suggested herein for removing permeate from the membrane module 10. Whenever a sweep fluid is used as an aid in removing permeate from the membrane tubes, the sweep fluid can be a liquid, vapor or gas.

The operation of the membrane module preferably passes a sweep fluid on the permeate side of the membrane to maintain a low concentration of the permeate on the permeate side of the membrane to provide the desired flux (i.e., rate of permeation) of the at least one fluid through the membrane.

The size of membrane module 10 depends on operational and cost considerations. The optimal size will depend upon the economic tradeoffs between the module diameter and length, the membrane performance, the length and diameter of the membrane tubes, and the number of membrane tubes.

Although not shown in the drawings, the module 10 may comprise one or more spacers placed between adjacent pairs of membrane units 12. Such spacers are well known in the art and the choice of spacer is dependent on the separation for which the module will be used.

FIG. 5 illustrates two bundles of stacked membrane units within a single shell. Although the module depicted in FIG. 5 shows the two bundles connected in series, it is also possible to connect the modules in parallel or to provide separate inlets and outlets for each stack and allow them to operate independently. The separation module of the present invention is versatile. It can be used alone or in combination with other similar or different modules. It can be used in series or parallel configuration, or in a process combined with other conventional separation processes, such as cryogenic distillation, pressure, temperature and vacuum swing adsorption. The two or more modules can also be combined in groups of two or more to provide higher purity and/or higher productivity.

A person skilled in the art, particularly one having the benefit of the teachings of this patent, will recognize many modifications and variations to the specific embodiments disclosed above. For example, a variety of temperatures and pressures may be used in accordance with the invention, depending on the overall design of the system, the membrane system selected, the desired component separations, and the composition of the feed gas. Additionally, although the drawing depicts shellside feed, the invention may also be designed for boreside feed wherein the feed fluid is introduced into the lumens of the membrane tubes and the permeate is removed from the exterior of the membrane tubes. As discussed above, the specifically disclosed embodiment and examples should not be used to limit or restrict the scope of the invention, which is to be determined by the claims below and their equivalents.

What is claimed is:

1. A module for separating a multi-component fluid comprising:
    a hollow shell having a hermetic enclosure;
    a plurality of separation assemblies in side by side relationship disposed in the shell;
    each separation assembly comprising a plurality of elongated membrane elements, at least a portion of each membrane element comprising a semipermeable surface to permit selective permeation of one or more components of the multi-component fluid into the membrane element;
    one end of the membrane elements in a separation assembly being attached to and hermetically sealed to an inlet manifold and the opposing end being attached to and hermetically sealed to an outlet manifold, at least one of the manifolds being unrestrained, thereby permitting axial movement of each membrane element in response to temperature changes;
    the shell having at least one inlet conduit for introducing the multi-component fluid into the shell for treatment at a first pressure and at least one exit conduit for passage of treated multi-component fluid out of the shell;
    at least one manifold from each separation assembly being in fluid communication with a manifold from one other separation assembly, the plurality of separation assemblies being in fluid communication with each other;
    at least one elbow conduit configured to provide the fluid communication between the at least one manifold and the manifold from one other separation assembly, wherein the elbow conduits are further configured to provide a spring-like overall structure sufficient to withstand strain due to thermal expansion; and
    at least one exit conduit for passage of permeate at a second pressure being lower than the first pressure from one of the manifolds out of the shell.

2. The module of claim 1 wherein the shell is generally cylindrical having an axial length.

3. The module of claim 2 wherein the plurality of membrane elements are membrane tubes that are substantially parallel to the axial length of the shell.

4. The module of claim 1 further comprising an additional conduit for passage of sweep gas from outside the shell into one of the manifolds.

5. The module of claim 1 wherein the separation assemblies are stacked in a disk-like configuration.

6. The module of claim 5 further comprising an additional conduit for passage of sweep gas from the outside the shell into one of the manifolds.

7. The module of claim 1 wherein a sealing material that is substantially leakproof to the multi-component fluid at least partly occupies the space between the exit conduit of the permeate and the shell.

8. The module of claim 1 further comprising spacer members between and spacing each adjacent separation assembly.

9. The module of claim 1 wherein the membrane element comprises a semipermeable membrane layer formed on a microporous support tube.

10. The module of claim 9 wherein the membrane layer is formed from a porous silica.

11. The module of claim 9 wherein the membrane layer has a pore size ranging from about 0.1 Å to about 10 Å.

12. The module of claim 1 wherein a plurality of baffles are disposed substantially perpendicular to at least one of the membrane elements and are effective to distribute multi-component fluid across the outer surface of the membrane elements.

13. The module of claim 2 wherein the cylindrical shell has oblate ends.

14. The module of claim 1 wherein the first pressure is above 1,200 psia.

15. The module of claim 1 wherein at least a portion of the shell is made of a first material and at least a portion of each membrane element is made of a second material, the first and second materials having different coefficients of thermal expansion.

16. The module of claim 9 wherein the membrane layer is formed from a zeolite.

17. A module for separating a multi-component fluid comprising:
    a chamber-defining, cylindrical shell having oblate end sections formed integrally with the cylindrical portion, at least a portion of the shell being formed of a first material;
    a plurality of stacked separation assemblies in side by side relationship disposed in the shell;
    each separation assembly comprising a plurality of elongated, substantially parallel, membrane elements, at least a portion of each membrane element comprising a wall being adapted to separate the multi-component fluid into permeate and retentate streams, at least a portion of the membrane being formed of a second material, said first and second materials having different coefficients of thermal expansion;

one end of each membrane element being attached to and hermetically sealed to a first manifold and the opposing end of each membrane element being attached to and hermetically sealed to a second manifold, one or both the first and second manifolds being unrestrained in the axial direction of the shell;

the shell having a first inlet conduit for introducing the multi-component fluid into the shell for treatment at a first pressure and a first exit conduit for passage of treated multi-component fluid out of the shell;

the first manifold of one separation assembly being in fluid communication with the first manifold of an adjacent separation assembly and the second manifold of one separation assembly being in fluid communication with the second manifold of an adjacent separation assembly, whereby the plurality of separation assemblies are in fluid communication with each other;

a first elbow conduit configured to provide the fluid communication between the first manifold of one separation assembly and the first manifold of an adjacent separation assembly, and a second elbow conduit configured to provide the fluid communication between the second manifold of one separation assembly and the second manifold of an adjacent separation assembly, wherein the first and second elbow conduits are further configured to provide a spring-like overall structure sufficient to withstand strain due to thermal expansion; and the shell having a second inlet conduit for introducing a sweep gas into the second manifold and a second outlet for passage of permeate from the first manifold out of the shell.

* * * * *